Figure 1:
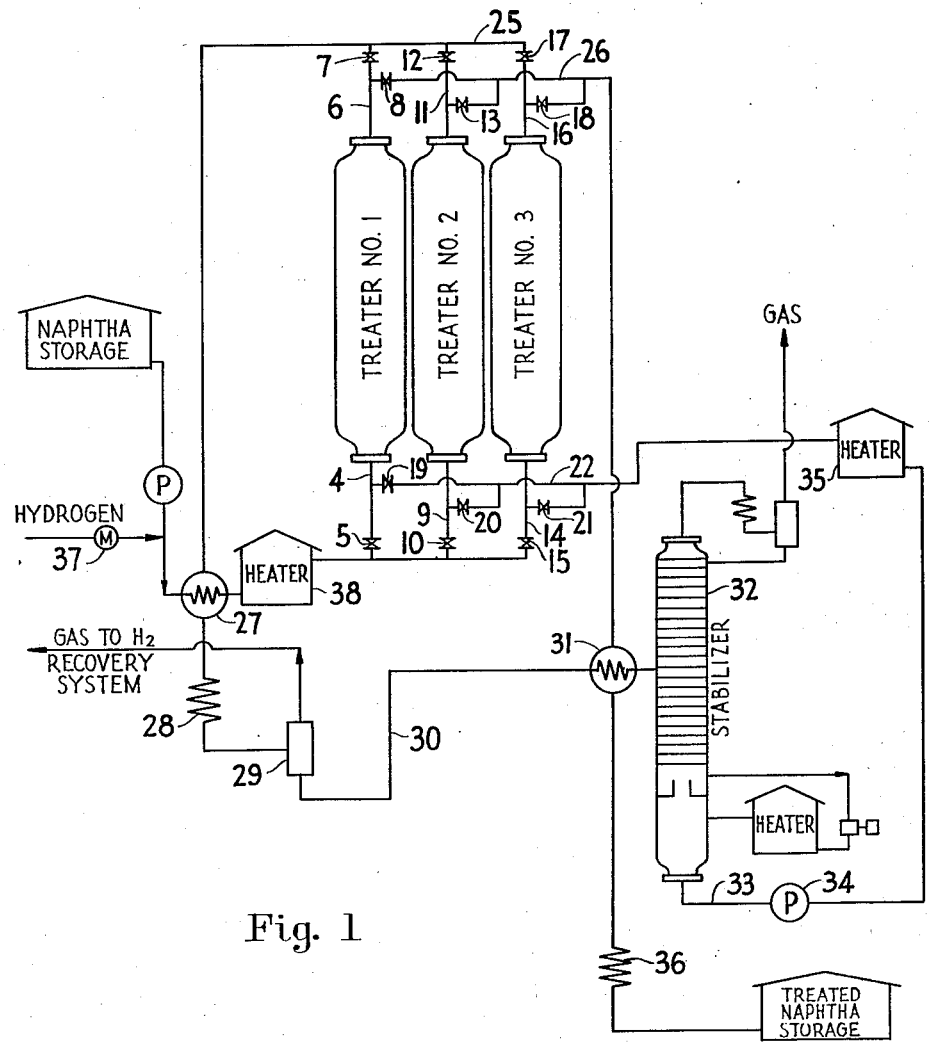

Jan. 10, 1939.　　A. L. LYMAN ET AL　　2,143,078
CATALYTIC DESULPHURIZATION OF PETROLEUM
Filed Nov. 23, 1936　　2 Sheets-Sheet 2

Inventors
ARTHUR L. LYMAN
HOWARD B. NICHOLS
ROBERT C. MITHOFF by　*JMAdams*
　　*Attorney*

Patented Jan. 10, 1939

2,143,078

UNITED STATES PATENT OFFICE 2,143,078

CATALYTIC DESULPHURIZATION OF PETROLEUM

Arthur L. Lyman, Howard B. Nichols, and Robert C. Mithoff, Berkeley, Calif., assignors to Standard Oil Company of California, San Francisco, Calif., a corporation of Delaware Application November 23, 1936, Serial No. 112,300

16 Claims. (Cl. 196—28)

This invention relates to a process of treating petroleum products whereby the sulphur content is reduced in a rapid and economical manner.

More particularly the invention involves a vapor phase treatment of crude cracked motor fuels or naphthas to decompose a major proportion of mercaptan and disulphide sulphur bodies contained in the cracked products.

The process of this invention comprises primarily three major steps:

(1) Vapor phase catalytic conversion to hydrogen sulphide of sulphur in organic sulphur-containing bodies present in the petroleum vapors;

(2) Removal of the hydrogen sulphide from the petroleum; and (3) Simultaneous production of a substantially doctor sweet petroleum product and formation of a highly active catalyst for use in the catalytic conversion operation.

Crude straight run or cracked gasolines or naphthas contain various amounts of sulphur in the form of mercaptan and disulphide compounds depending upon the source of the crude oils from which they are derived and upon the nature of the distillation and/or cracking process employed in their production. In general, sulphur compounds are considered undesirable in motor fuels. The presence in large amounts of either mercaptans or disulphides is conducive to instability in color and gum forming tendencies of the petroleum distillate.

Various processes have been utilized to remove mercaptans from gasoline, among which processes are oxidation to disulphides by treatment with doctor solution, treatment with sulphuric acid, adsorption in the liquid phase with adsorbents such as silica gel and catalytic decomposition in the vapor phase.

Catalysts which are immune to sulphur poisoning and are suitable for decomposing organic sulphur-containing bodies present in gasoline are known in the prior art. Several such catalysts operate satisfactorily when treating straight-run gasolines. However, treatment of cracked gasolines or naphthas has been found to involve additional difficulties of catalytic poisoning and resultant short catalyst life. Catalysts which are effective to treat large quantities of straight-run gasoline are found to lose their activity and become almost if not entirely ineffective after short periods of treating cracked gasolines.

For example, certain clay catalysts which remain active to decompose mercaptans almost indefinitely when treating straight-run gasolines are comparatively short-lived when applied to cracked distillates. It has been observed that the more porous the catalyst the more active it appears to be in the treatment of straight-run gasolines. However, it has also been observed that the more porous the clay catalyst the shorter is its effective life in treating cracked distillates. In general, it can be safely said that the major difficulty encountered in attempts to catalytically desulphurize cracked naphtha has been short catalyst life and that processes which have been proposed have not been commercially successful because of this major difficulty.

Specific conditions and modes of operation with a particular group of catalysts have been discovered which overcome to a large degree the above difficulties and which may yield as much as 1,400,000 gallons of essentially doctor sweet gasoline per ton of catalytic material without regeneration thereof. It is this discovery, together with other features herein pointed out, which constitutes the subject matter of the present invention.

It is therefore an object of the invention to provide a process for removing sulphur from petroleum distillates in an economical and facile manner.

Another object is to provide a process of catalytically converting sulphur contained in organic bodies present in petroleum distillates to hydrogen sulphide.

An additional object of the invention is to provide methods of procedure and conditions of operation which decrease catalyst poisoning and increase many-fold the treating yields obtained in a process for producing substantially doctor sweet cracked motor fuel.

An object of the invention also comprises the production of a highly active catalyst for desulphurizing petroleum distillates.

A further object of the invention is to provide a combined process for simultaneously removing sulphur catalytically from petroleum distillates, producing doctor sweet gasoline and forming a highly active catalyst to replace the catalyst supply as it is exhausted.

In the drawings Figure 1 is a diagrammatic representation of apparatus in which the process may be carried out.

Figure 2:
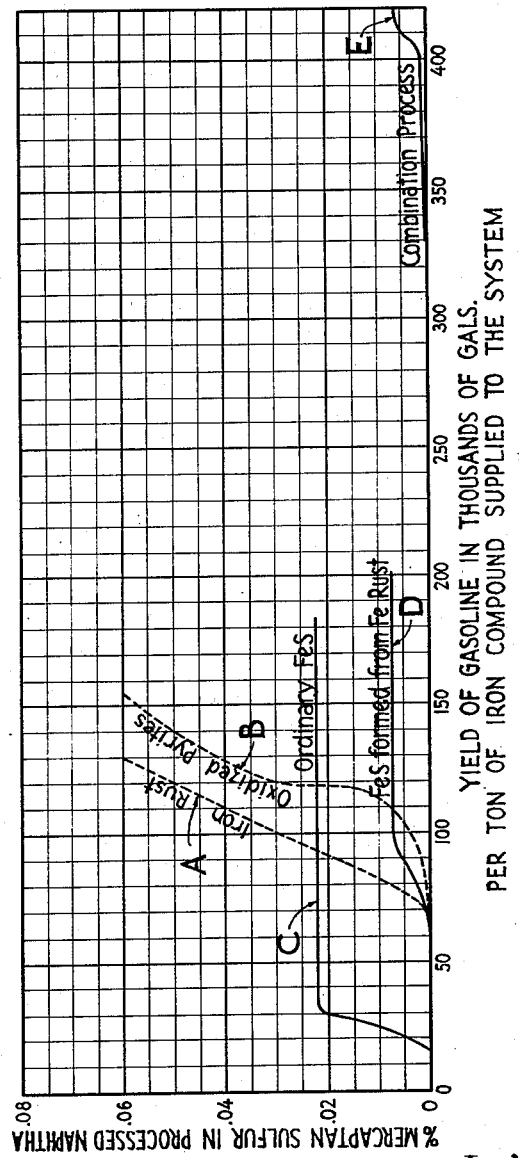

Figure 2 is a graph showing comparative effectiveness of different iron sulphides and iron oxides in removing mercaptan sulphur from cracked gasoline. This graph also shows comparative yields of doctor sweet gasoline by treatment with the various compounds separately and by the combination process hereinafter described.

As has been stated, the present process is particularly useful for the treatment of cracked gasolines or naphthas. However, it is also applicable to straight-run petroleum distillates since much less difficulty is encountered from catalyst poisoning when treating these latter types of materials.

As previously indicated herein certain specific conditions and modes of operation have been discovered which are essential to adequate catalyst life and economical operation of the process of this invention. One of the most critical factors of the process is the temperature of the catalyst and vapors in the treating chamber. This temperature should be maintained at 675° F. or above in order to obtain adequate reduction in sulphur content. Also, the temperature should be maintained below approximately 850° F. to avoid undue acceleration of catalyst deterioration or poisoning. The optimum temperature is about 725° F.

Elevated pressure is desirable because of increased yields and effectiveness in reducing sulphur content, although not absolutely necessary to operativeness of the process. Pressures of 300–600#/sq. in. are adequate. Extremely high pressures (over 1000#/sq. in.) are undesirable because of the tendency to increase thermal polymerization of olefines and cause rapid deterioration in catalyst activity.

The presence of hydrogen or a suitable gas yielding hydrogen is essential in the catalytic treatment with sulphides of metals of the iron group. The amount of hydrogen necessary varies with the stock being treated and the conditions of operation. There must be at least enough hydrogen to react with all mercaptan sulphur present (2 atoms of hydrogen per atom or mercaptan sulphur). For example, a naphtha containing about 0.16% by weight of mercaptan sulphur would require at least 0.12 cu. ft. of hydrogen per gallon of liquid naphtha and for optimum operation at least approximately 0.5 cu. ft. of hydrogen per gallon of naphtha charged is desirable.

Inasmuch as the present process does not involve hydrogenation of unsaturated hydrocarbons present in the naphtha (although such a reaction may occur to a very minor extent) larger proportions of hydrogen are neither necessary nor desirable. In general, it has been found that 5 cu. ft. of hydrogen per gallon of charge are entirely sufficient for desulphurization of most stocks and will not produce a sufficient amount of hydrogenation to materially reduce the octane rating of the product.

The catalyst which has been found most suitable comprises a sulphide of a metal of the iron group and preferably iron sulphide because of its lower cost. Nickel and cobalt sulphides are also effective. Ferrous sulphide formed in situ by treatment of a porous iron oxide, such as iron rust or oxidized iron pyrites, with hydrocarbon vapors containing combined sulphur constitutes the most efficient catalyst which has been discovered and one which is much more active than ordinary purchased iron sulphide (as shown by curved C and D of Figure 2), although the latter material is operative.

The physical form of the catalyst should be granular and the granules should be of sufficient size to allow free vapor flow. Large lumps are of course undesirable and 30 to 60 mesh material has been found to be satisfactory.

To guide those skilled in the art in utilizing most satisfactorily the results and discoveries of this invention, the following specific examples of methods and of suitable apparatus are given.

In the apparatus shown schematically in Figure 1, three treating chambers are provided. Treater 1 has an inlet 4 with valve 5 for controlling admission of naphtha vapors and hydrogen. Outlet 6 for treater 1 is controlled by valves 7 and 8. Similarly treater 2 is provided with inlet 9 having a control valve 10. Outlet 11 from treater 2 has control valves 12 and 13. Inlet 14 with valve 15 and outlet 16 with valves 17 and 18 are provided for treater 3.

Auxiliary inlet header 22 is provided for returning the vapors to any selected treater by proper control of valves 19, 20 and 21.

Valves 7 and 8 permit treated gases from treater 1 to be directed through either header 25 or header 26 as circumstances demand. Valves 12, 13 and 17, 18 permit control of gases from treaters 2 and 3 respectively, in the same manner.

Header 25 conducts the vapors to heat exchanger 27, condenser 28, and separator 29, where fixed gases are removed and the naphtha condensed to liquid phase. The naphtha then flows through conduit 30 and heat exchanger 31 to stabilizer 32. The stabilizer removes dissolved hydrogen sulphide from the naphtha by fractionation. Other fixed gases when present may also be removed at this point with the hydrogen sulphide and through a conventional reflux and separator arrangement at the top of the stabilizer. The stabilized naphtha is conducted through outlet 33 and pump 34 to heater 35 where it is again vaporized and admitted to the inlet side of any of the treaters through header 22 by a proper control of the various valves.

Header 26 conducts treated naphtha vapors through heat exchanger 31 to condenser 36 where they are cooled, condensed to liquid phase and passed to storage.

The volume of hydrogen admitted to the system with the naphtha is controlled by a metering valve 37 and the naphtha to be treated is pumped through heat exchanger 27 and heater 38 to the treaters.

The treating chambers consist of vessels insulated against heat-losses and filled with a granular treating agent retained in position by suitable supports such as screens. Provision of heating means in or around the chambers is unnecessary since the temperature of the vapors and catalyst may be controlled by heating the naphtha to a temperature slightly above that at which the treaters are operated. Heaters 35 and 38 comprise suitable means for vaporizing the naphtha and controlling the temperature in the treating chambers. Such a process of temperature regulation is commercially feasible because radiation losses can be reduced to a small proportion of the heat requirements of the process. As a result, only a minor amount of overheating of the petroleum vapors is necessary to compensate for radiation losses in the treating chambers.

The following exemplifies a complete cycle of operation utilizing the arrangement of apparatus indicated in Figure 1.

Naphtha, either direct from the cracking stills or after condensation at system pressure and removal of fixed gases is admitted in liquid or vapor form at a pressure of 450# gage to the treating system in Figure 1. Gaseous hydrogen is also introduced through metering valve 37 at the rate of 5 cu. ft./gallon of liquid naphtha fed to the system. This mixture passes through heat exchanger 27, heater 38, open valve 5 and inlet 4 to treater 1 filled with a granular ferrous sulphide catalyst. The naphtha vapors and hydrogen are heated to and/or maintained at approximately 725° F. in the treater. During this first stage of treatment a major proportion of the mercaptan and disulphide sulphur is converted to hydrogen sulphide. The treated gases leave treater 1 through outlet 6, valve 7, and pass through header 25 and heat exchanger 27 to condenser 28 and separator 29 where the naphtha vapors are condensed to liquid phase and fixed gases such as hydrogen and hydrogen sulphide are removed.

These fixed gases may be treated for recovery of hydrogen, which can be re-circulated to the system inlet.

From separator 29 the naphtha passes through conduit 30, heat exchanger 31 to stabilizer 32 where sufficient pressure is released to allow fractionation in stabilizer 30 and removal of hydrogen sulphide and other dissolved fixed gases which may be present.

The stabilized liquid phase naphtha passes through line 33 and pump 34 to heater 35 where it is again vaporized. The pressure in this portion of the system may be somewhat less than that in treater 1, the pressure differential being that produced by fractionation and removal of dissolved gases in stabilizer 32. From the heater 35 naphtha vapor passes through auxiliary header 22, valve 20 and inlet 9 to treater 2.

At this stage of the process the second treater is filled with iron oxide in granular form, preferably a porous oxide such as iron rust or oxidized iron pyrites. The naphtha vapors being treated are heated to and/or maintained at from about 675 to 850° F., preferably about 725° F., while in treater 2. Hydrogen or steam may also be admitted at this point to prolong the treating life of the iron oxide and to inhibit any tendency to poison the iron sulphide catalyst as it is being formed. Although highly useful, this last procedure is not essential in a properly controlled process.

The last traces of mercaptan sulphur are removed in treater 2 and the naphtha passes through outlet 11, valve 13, header 26, heat exchanger 31 and condenser 36 to storage.

The naphtha is permitted to flow through the above described path until the iron oxide in treater 2 is converted to iron sulphide as shown by a rise in mercaptan sulphur content in the refined product. This iron sulphide then serves as a highly active catalyst in the second stage of operation in which the path of flow may be briefly described as follows: naphtha and hydrogen under 450# pressure pass from the inlet through heat exchanger 27, heater 38, valve 10, inlet 9, treater 2 (at approximately 725° F.), outlet 11, valve 12, header 25, heat exchanger 27, condenser 28, separator 29, line 30, heat exchanger 31, stabilizer 32, line 33, pump 34, heater 35, valve 21, inlet 14, treater 3 (filled with iron oxide and operated at 725° F.), outlet 16, valve 18, heat exchanger 31, and condenser 36 to storage.

During this second stage in the operation treater 1 is not in use and the iron sulphide therein is either converted to oxide by burning, steaming, etc. in a well known manner, or replaced by fresh porous iron oxide which is to be used in the next stage of the process.

When the oxide in treater 3 is exhausted and converted to sulphide, treater 1 is cut back into the system and the path of flow is as follows:

From the inlet system through valve 15 and inlet 14 to treater 3 (now filled with iron sulphide and still at 725° F.), thence through outlet 16, valve 17, header 25, heat exchanger 27, condenser 28, separator 29, line 30, heat exchanger 31, stabilizer 32, line 33, pump 34, heater 35, auxiliary header 22, valve 19, treater 1 (filled with fresh or regenerated iron oxide), outlet 6, valve 8, header 26, heat exchanger 31, and condenser 36 to storage.

During this period the ferrous sulphide in treater 2 is either converted to or replaced by iron oxide and when the oxide in treater 1 is exhausted and converted to sulphide treater 3 is cut out of and treater 2 cut into the system so that the path of the naphtha vapor is the same as that first described, that is, first through treater 1 containing iron sulphide, then through treater 2 containing iron oxide. The ferrous sulphide in treater 3 is converted to or replaced by iron oxide preparatory to the next stage of treatment.

Summarizing the above series of operations it is seen that they provide a continuous process for:

(1) Decomposing mercaptans and disulphides to hydrogen sulphide and hydrocarbons utilizing ferrous sulphide to catalyze the reaction;

(2) Removing the hydrogen sulphide so formed;

(3) Removing the remaining unconverted mercaptan sulphur by reaction with iron oxide; and (4) Utilizing the iron sulphide so formed as a catalyst in the first step of treatment.

By following this combination process tremendous yields of doctor sweet gasoline are obtainable without regeneration or replacement of the treating agents. The following specific examples are illustrative of results obtained from both the combination and sub-combination processes.

Using ordinary iron sulphide as purchased on the market, cracked gasoline vapors containing .056% mercaptan sulphur and .036% disulphide sulphur, together with 5 cu. ft. of hydrogen per gallon of liquid gasoline were passed over the sulphide at 725° F. and 450#/sq. in. pressure at the rate of 5 volumes of liquid gasoline per bulk volume of catalyst per hour. As shown by Figure 2, curve C, the ferrous sulphide removed all mercaptan sulphur to a yield of 15,000 gallons per ton of catalyst and thereafter the treatment quickly leveled off to 0.22% mercaptan sulphur.

An analysis of the catalyst before and after this treatment is given below and shows that the initial production of doctor sweet gasoline was probably due to chemical reaction with the catalyst which caused an increase in sulphur content. The remainder of the sulphur removal was truly catalytic.

*Catalyst—Ferrous sulphide*

|  | Fresh | Spent |
|---|---|---|
| Weight | 0.610 lb. | 0.587 lb. |
| Analysis: | Percent | Percent |
| Iron | 69.7 | 62.8 |
| Sulphur | 29.5 | 35.9 |
| Silica (by diff.) | 0.8 | 0.8 |
| Carbon | 0.0 | 0.5 |
|  | 100.0 | 100.0 |
| Calculated comp.: | | |
| Free iron | 18.1 | 0.0 |
| Ferrous sulphide | 81.1 | 98.7 |
| Silica | 0.8 | 0.8 |
| Carbon | 0.0 | 0.5 |
|  | 100.0 | 100.0 |

It is believed that two main reactions are effected by this catalytic treatment to remove both disulphide and mercaptan sulphur according to the following equations:

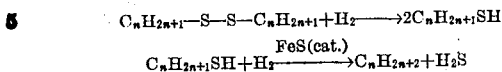

$$C_nH_{2n+1}-S-S-C_nH_{2n+1}+H_2 \longrightarrow 2C_nH_{2n+1}SH$$
$$C_nH_{2n+1}SH+H_2 \xrightarrow{\text{FeS(cat.)}} C_nH_{2n+2}+H_2S$$

A second example illustrates the increased effectiveness of a similar treatment in which the sulphide catalyst is formed in situ by reaction of iron rust (30 to 60 mesh) with mercaptan sulphur contained in gasoline vapors. Cracked gasoline, together with 5 cup. ft. of hydrogen per gallon of liquid feed was passed over iron rust at 725° F. and 450#/sq. in. pressure at a feed rate of 5 volumes of liquid gasoline per bulk volume of rust per hour. The original naphtha contained .054% mercaptan sulphur and .047% disulphide sulphur. Curve D, Figure 2, shows that the treatment produced doctor sweet gasoline to a yield of 60,000 gallons per ton of oxide at which time the oxide was converted to the sulphide as shown by increased sulphur content of the treated vapors. From this point on the sulphide acted as a catalyst and treated to produce a mercaptan sulphur content of .007%.

Analysis of the catalyst before and after treatment was as follows:

| Calc. comp. | As charged | Dehydrated | As removed | Carbon free |
|---|---|---|---|---|
| | Percent | Percent | Percent | Percent |
| Ferric oxide (Fe₂O₃) | 84.7 | 99.1 | 0.0 | 0.0 |
| Ferrous sulphide (FeS) | 0.0 | 0.0 | 89.7 | 99.2 |
| Combined water | 14.5 | 0.0 | 0.0 | 0.0 |
| Carbon | 0.0 | 0.0 | 9.4 | 0.0 |
| Silica | 0.8 | 0.9 | 0.9 | 0.8 |
| | 100.0 | 100.0 | 100.0 | 100.0 |

Attention is directed to the decided superiority of this catalyst over the ordinary iron sulphide of the previous example. The catalytic treatment with ordinary ferrous sulphide leaves approximately three times as much mercaptan sulphur in the treated vapors as does the catalyst formed in situ by chemical reaction with the vapors.

It is believed to be entirely unexpected and highly unpredictable that treatment of a porous iron oxide with cracked naphtha containing sulphur bodies would yield not only an active catalyst but actually a catalyst as long lived and more active than ordinary ferrous sulphide. This is particularly true in view of the fact that catalysts of a porous nature have been found unsatisfactory for treatment of cracked naphthas, presumably because of formation of gum, carbon and the consequent clogging of the catalyst pores. The present discovery that porous oxides form highly active sulphide catalysts by reaction with sulphur bodies in the presence of cracked naphthas seems to be contrary to the general experience concerning catalyst activity in this art.

Curves A and B of Figure 2 illustrate the relative life and effectiveness of treatments with iron rust and oxidized iron pyrites. In these runs cracked gasoline vapors at 725° F. and 300#/sq. in. pressure were passed over the oxide at the rate of 5 volumes of liquid gasoline per bulk volume of oxide (30 to 60 mesh) per hour. The gasoline before treatment by the rust contained .098% mercaptan sulphur as did also the gasoline treated with the oxidized iron pyrites. A doctor sweet product was obtained to a yield of 60,000 gallons per ton of iron rust and 80,000 gallons per ton of oxidized pyrites. The reason for this increased yield with the oxidized pyrites has not been established. It is not possible to write simple equations for the reactions which occur when pressure naphtha is treated with these materials. The mercaptan sulphur is converted to a metallic sulphide, but what becomes of the rest of the mercaptan molecule is not definitely known. The fact that the chemistry involved is so complex adds to the difficulty of explaining the phenomenon of increased treating efficiency obtained with oxidized pyrites.

Treatment by the combined process previously described hereinabove and using ordinary iron sulphide gives yields of 320,000 to 400,000 gallons of essentially doctor sweet gasoline from a product originally containing .098% mercaptan sulphur, as shown by curve E of Figure 2. First forming a more active catalyst by using iron rust or oxidized iron pyrites as a reagent in the second stage of the combined treatment, and then utilizing the converted oxide as the catalyst in the first stage of the treatment, enables one to obtain treating yields of from 1,000,000 to 1,400,000 gallons of doctor sweet gasoline per ton of oxide treating agent supplied to the system. If the spent sulphide catalyst is converted back to the oxide by burning or other well known processes, even greater yields are obtainable.

The tremendous yields of this combined process may be better appreciated if it is pointed out that treatment of 1,000,000 gallons of gasoline containing .098% mercaptan sulphur to produce a doctor sweet gasoline requires removal of 3.25 tons of sulphur with 1 ton of iron oxide. It is again stressed that these yields are obtained in treatment of cracked petroleum products containing olefines and other unsaturated bodies which heretofore have caused catalyst poisoning to such an extent that catalytic desulphurizing processes have not been commercially feasible for such cracked products.

As previously mentioned nickel and cobalt sulphides are active, in the presence of hydrogen, to convert mercaptan sulphur to hydrogen sulphide. These sulphides are therefore regarded as falling within the broader scope of the present invention and, accordingly, the term "metal of the iron group" has been used throughout the claims to designate those metals falling in Series 4, Group VIII, of the Periodic System.

The term "mercaptan sulphur" used in the appended claims designates combined sulphur present in an organic compound such as a mercaptan, and is not intended to include free or uncombined sulphur.

It should be apparent to those skilled in the art that various forms of apparatus other than that specifically described in the present specification may be utilized in carrying out the present process. It should also be apparent that although specific operating data have been given and the process described in considerable detail, variations in characteristics of different distillates will enable or require numerous changes and modifications to be made. Accordingly, all such changes and modifications as come within the terms and spirit of the appended claims are to be embraced within the scope of the present invention.

We claim:

1. A process of treating petroleum distillates which comprises passing said distillate in vapor phase and at a temperature of from approximately 675° F. to approximately 850° F. over a catalyst comprising a sulphide of a metal of the iron group, supplying hydrogen to said vapors and catalyst in a proportion sufficient to convert disulphides to mercaptans and mercaptan sulphur to hydrogen sulphide, removing hydrogen sulphide so formed, and passing said treated distillate at a temperature of from approximately 675° F. to approximately 850° F. over an oxide of a metal of the iron group, whereby the mercaptan sulphur content of the distillate is further reduced by reaction with said oxide and formation of a sulphide of said metal.

2. A process as in claim 1, in which said distillate is maintained at a pressure of from approximately 300 to 600# per square inch.

3. A process as in claim 1, in which the catalyst is an iron sulphide.

4. A process as in claim 1, in which the catalyst is a ferrous sulphide.

5. A process as in claim 1, in which the oxide is a porous iron oxide.

6. A process as in claim 1, in which the oxide is a porous iron oxide and which comprises the added steps of passing a petroleum distillate in vapor phase and at a temperature of approximately 675° F. to approximately 850° F. over the sulphide formed from said oxide, and simultaneously supplying hydrogen to said vapors and sulphide in a proportion sufficient to convert disulphides to mercaptans and mercaptan sulphur to hydrogen sulphide.

7. A process of catalytically decomposing mercaptan sulphur to hydrogen sulphide, which comprises passing vapors containing a mercaptan and an unsaturated hydrocarbon over a sulphide of a metal of the iron group in the presence of no more than 5 cu. ft. of hydrogen per gallon of charge and at least 2 atoms of hydrogen per atom of mercaptan sulphur and at a temperature of from approximately 675° F. to approximately 850° F. whereby said mercaptan is catalytically converted to a sulphur-free hydrocarbon and hydrogen sulphide without substantial hydrogenation of said unsaturated hydrocarbon.

8. A process as in claim 7, in which the sulphide is a ferrous sulphide.

9. A process as in claim 7, in which the sulphide is a sulphide formed by the reaction of a porous oxide of the iron group with combined sulphur contained in petroleum distillates.

10. In a process of catalytically desulphurizing petroleum with a sulphide of a metal of the iron group, the steps of forming a highly active desulphurization catalyst and simultaneously removing combined sulphur from cracked gasolines, which comprise treating a porous oxide of a metal of the iron group with cracked gasoline vapors from said desulphurizing process containing combined sulphur capable of reacting with said oxide to form the sulphide of said metal, and maintaining the temperature of said vapors at from approximately 675° F. to approximately 850° F. during said treatment, thereby converting said oxide to an active sulphide catalyst for the catalytic desulphurization step.

11. A process as in claim 10, in which said oxide is an iron oxide.

12. A process as in claim 10, in which the catalytic activity of the sulphide is enhanced by introducing hydrogen with the cracked gasoline vapors while contacting the metal oxide.

13. A process of treating cracked gasoline containing combined sulphur to produce a doctor sweet product which comprises providing a plurality of treating chambers, at least one of which contains a catalyst comprising a sulphide of a metal of the iron group, and at least one of said chambers containing an oxide of a metal of the iron group, passing said distillate in vapor phase over said sulphide catalyst, simultaneously supplying hydrogen to said vapors and catalyst in quantities sufficient to convert disulphides to mercaptans and a major portion of the mercaptan sulphur to hydrogen sulphide, maintaining the temperature of the gases in said sulphide catalyst chamber at a temperature of approximately 650° F. to 850° F. to effect catalytic conversion of mercaptan sulphur to hydrogen sulphide, removing the hydrogen sulphide so formed, passing said treated cracked gasoline in vapor form through said oxide-containing chamber and over said metal oxide at a temperature of 675° F. to 850° F. to thereby remove residual mercaptan sulphur, continuing said treatment until the oxide is converted to a sulphide and catalyzing conversion of mercaptan sulphur to hydrogen sulphide with said last mentioned metal sulphide as formed in situ.

14. A continuous cyclic process for desulphurising petroleum distillates which comprises providing a catalyst body composed of an iron sulphide and providing a reagent comprising an iron oxide, catalyzing conversion of mercaptan sulphur to hydrogen sulphide with said catalyst body and treating petroleum distillates containing combined sulphur with said oxide whereby said catalyst becomes less active and said oxide is converted to a highly active catalytic sulphide, converting said first mentioned iron sulphide of reduced activity to a reagent oxide, catalyzing conversion of mercaptan sulphur to hydrogen sulphide with said sulphide formed in situ from said first mentioned oxide, and utilizing said oxidized iron sulphide to remove residual mercaptan sulphur in petroleum vapors from a catalytic iron sulphide treatment.

15. A process of catalytically converting mercaptans to hydrogen sulphide and hydrocarbons which comprises passing vapors containing a mercaptan, together with a small amount of hydrogen over an iron sulphide formed by the reaction of iron rust with organic sulphur compounds contained in petroleum distillates, said catalysts and vapors being at a temperature of from approximately 675° F. to approximately 850° F., and said small amount of hydrogen comprising at least two atoms of hydrogen per atom of mercaptan sulphur.

16. A process of catalytically converting mercaptans to hydrogen sulphide and hydrocarbons which comprises passing vapors containing a mercaptan, together with a small amount of hydrogen over an iron sulphide formed by the reaction of oxidized iron pyrites with organic sulphur compounds contained in petroleum distillates, said catalysts and vapors being at a temperature of from approximately 675° F. to approximately 850° F., and said small amount of hydrogen comprising at least two atoms of hydrogen per atom of mercaptan sulphur.

ARTHUR L. LYMAN.
HOWARD B. NICHOLS.
ROBERT C. MITHOFF.

CERTIFICATE OF CORRECTION.

Patent No. 2,143,078. January 10, 1939.

ARTHUR L. LYMAN, ET AL.

It is hereby certified that error appears in the printed specification of the above numbered patent requiring correction as follows: Page 2, first column, line 39, for the word "or" read of; page 3, second column, line 50, for "0.22%" read .022%; page 4, first column, line 13, for "cup." read cu.; and that the said Letters Patent should be read with this correction therein that the same may conform to the record of the case in the Patent Office.

Signed and sealed this 2nd day of May, A. D. 1939.

Henry Van Arsdale (Seal) Acting Commissioner of Patents.